United States Patent [19]

Watkins et al.

[11] Patent Number: 4,559,535
[45] Date of Patent: Dec. 17, 1985

[54] SYSTEM FOR DISPLAYING INFORMATION WITH MULTIPLE SHADES OF A COLOR ON A THIN-FILM EL MATRIX DISPLAY PANEL

[75] Inventors: Randy W. Watkins, Sun Valley; Robert J. Bell, Moorpark; Joseph A. Martorano, Studio City; Walter F. Essinger, Thousand Oaks, all of Calif.

[73] Assignee: Sigmatron Nova, Inc., Thousand Oaks, Calif.

[21] Appl. No.: 397,127

[22] Filed: Jul. 12, 1982

[51] Int. Cl.⁴ ............................................. G09G 3/30
[52] U.S. Cl. .................... 340/793; 340/781; 340/825.81; 358/241
[58] Field of Search ............... 340/793, 701, 703, 781, 340/825.81; 358/240, 241, 280, 283, 81, 75

[56] References Cited

U.S. PATENT DOCUMENTS

| 3,829,613 | 8/1974 | Melchior | 358/81 |
| 3,906,290 | 9/1975 | Kurahashi et al. | 340/793 X |
| 4,210,934 | 7/1980 | Kutazagi | 358/241 |
| 4,438,453 | 3/1984 | Alston | 358/75 X |

Primary Examiner—Marshall M. Curtis
Assistant Examiner—Vincent P. Kovalick
Attorney, Agent, or Firm—John T. Matlago

[57] ABSTRACT

A plurality of memory sections is provided each storing binary data to be employed for refreshing picture elements of a thin-film EL matrix display panel on successive frame time periods constituting an integration time period. The number of frame time periods in an integration time period corresponds to the number of different shades to be displayed on the panel. The binary data stored in each of the memory sections differs. Thus, when the binary data in the memory sections are read out on successive frame time periods, some of the picture elements on the panel are refreshed more than others during the integration time period. Accordingly, the eye of the viewer receives more light from some picture elements than others during each integration time period which results in the relative brightness levels and, therefore, the shades of the picture elements to vary.

In a modified embodiment of the present invention each of the memory sections is binarily weighted and, during an integration time period, each memory section is read out a number of frame time periods corresponding to its binary weight in order to obtain the different brightness levels or shades on the panel.

10 Claims, 14 Drawing Figures

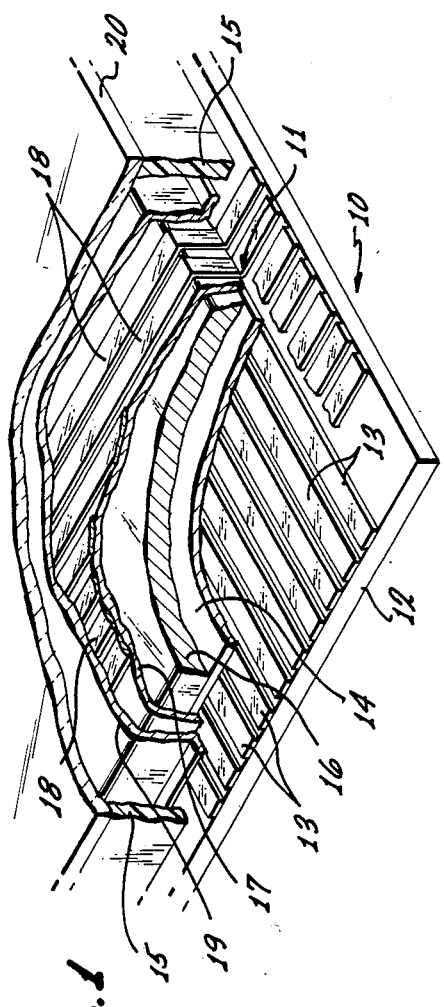
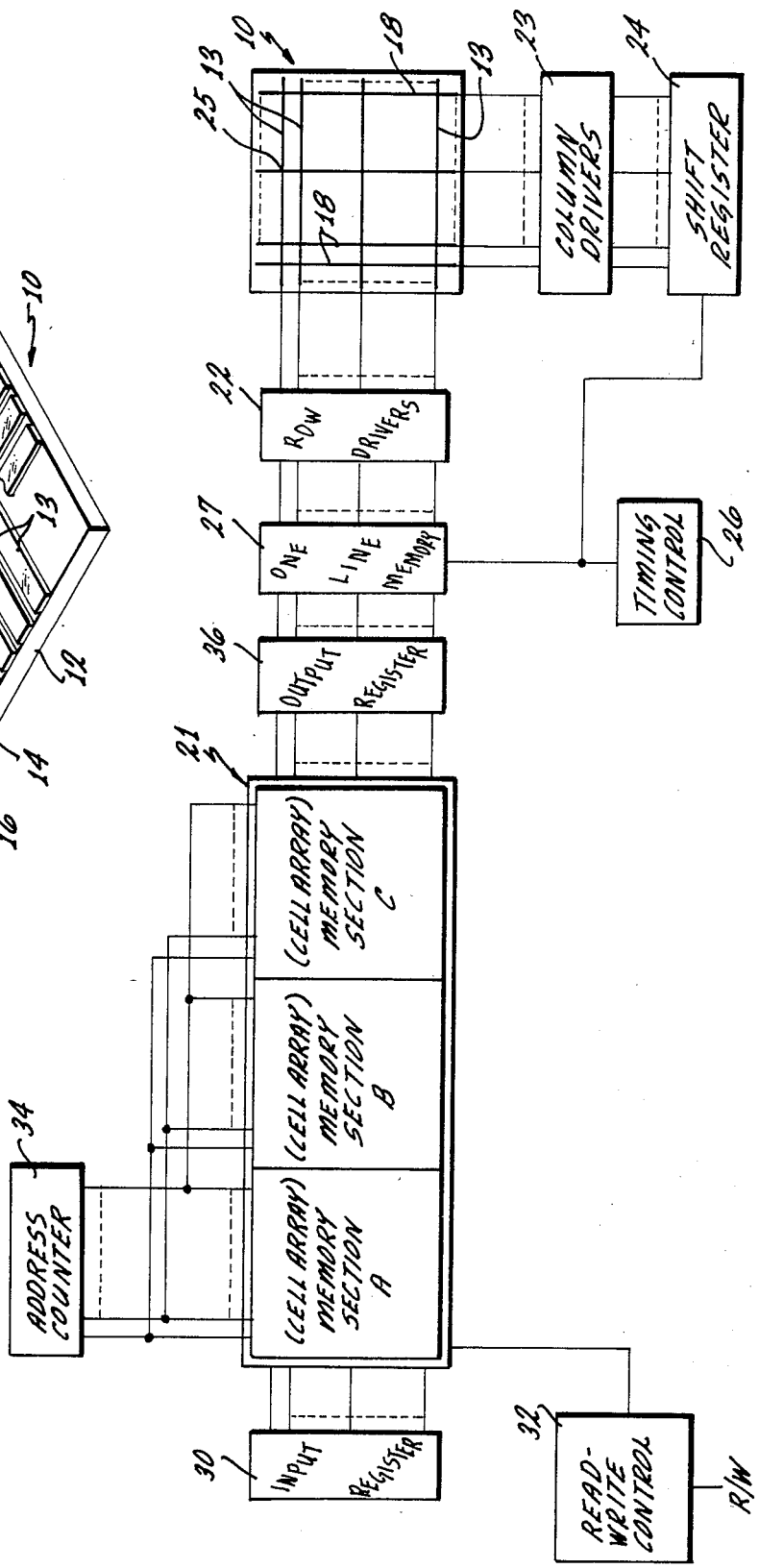

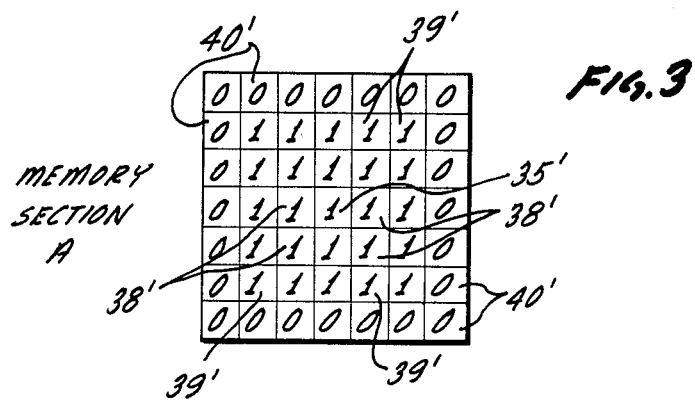
FIG.3
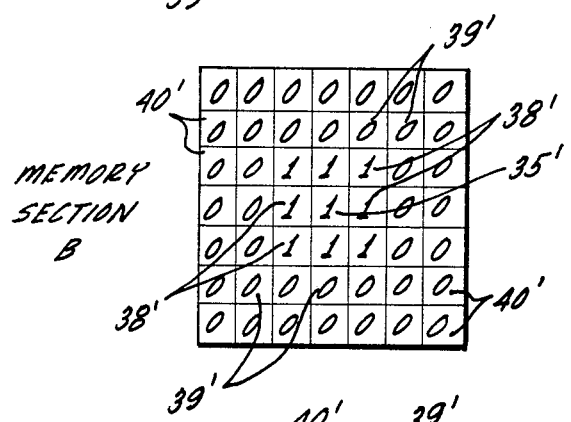
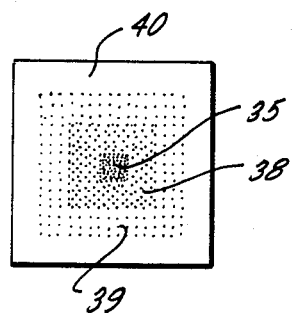
FIG.5
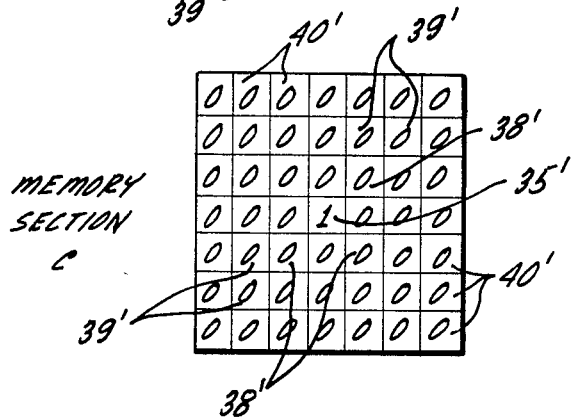
FIG.4
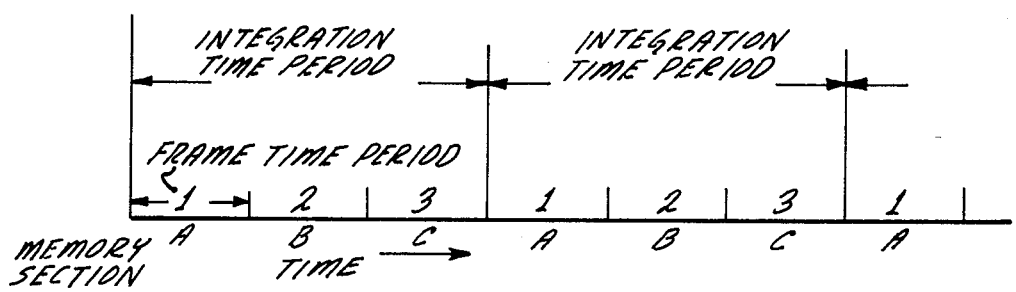

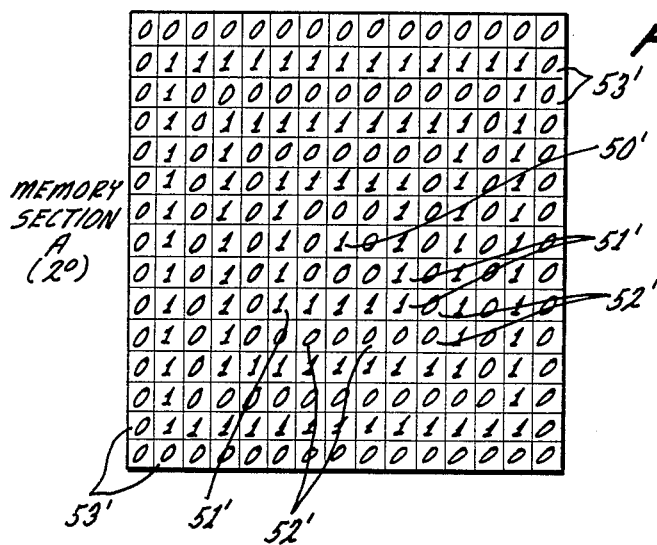
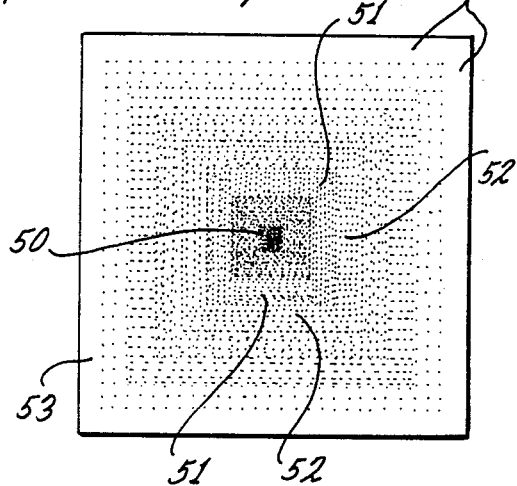
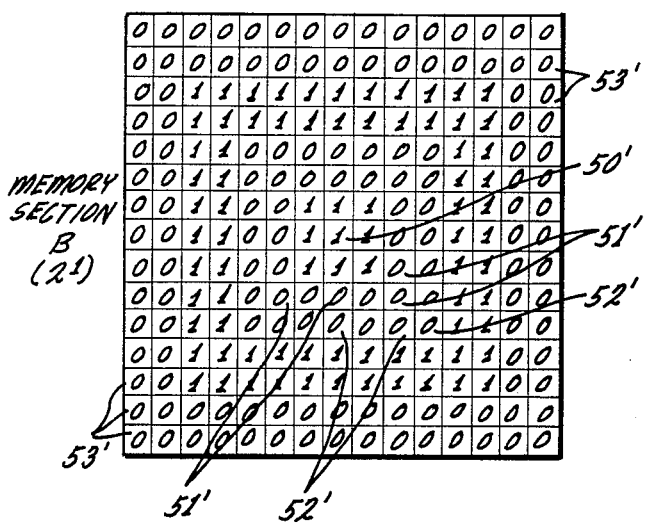
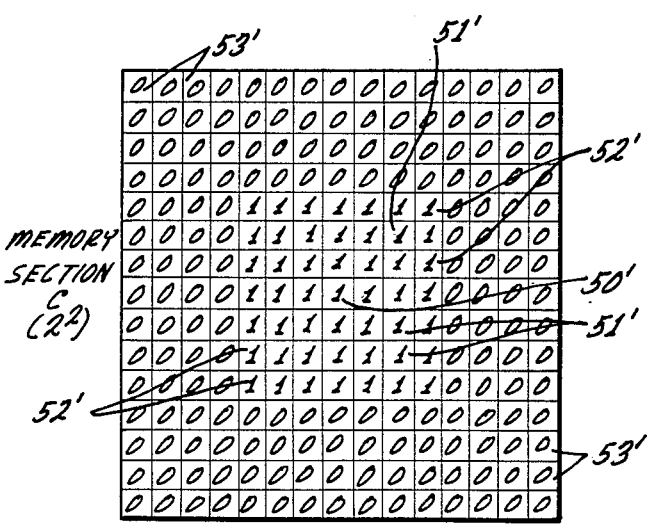

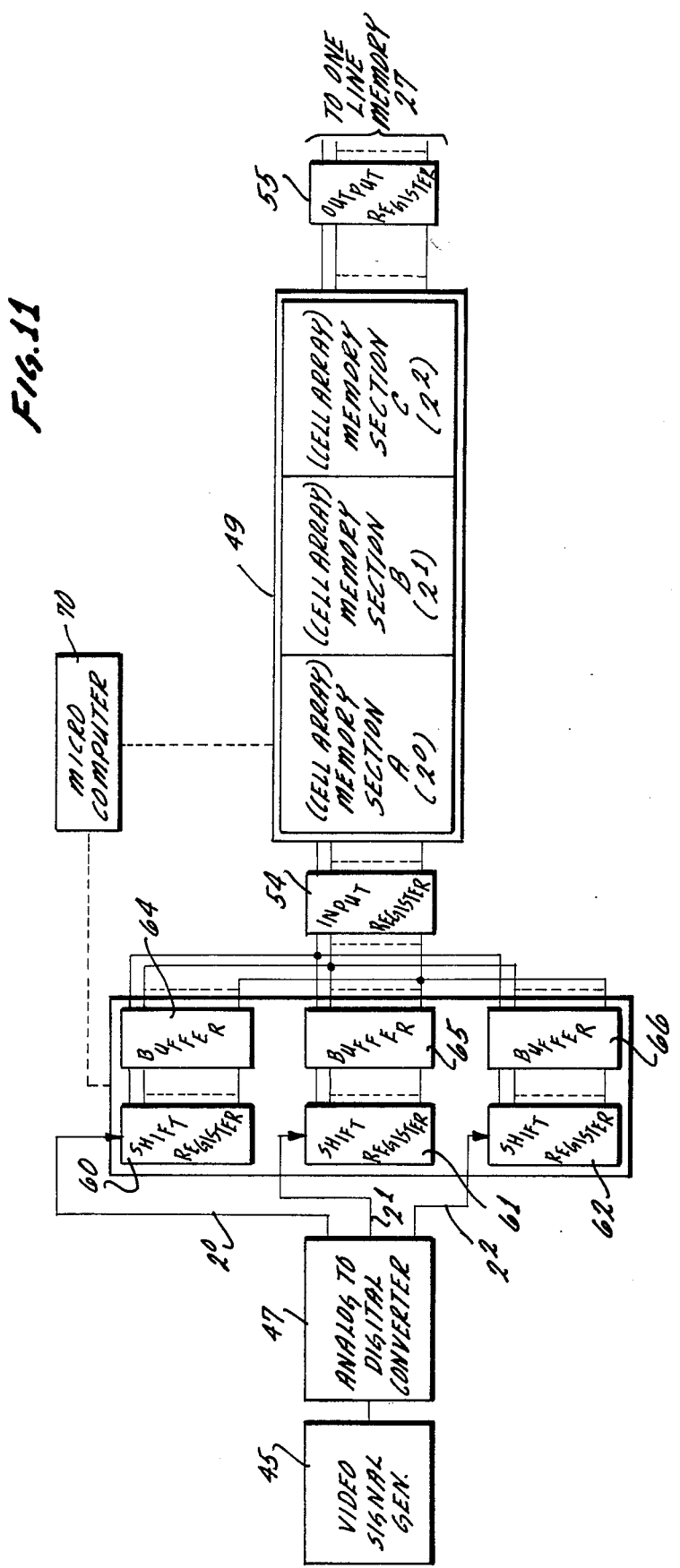

Fig. 12
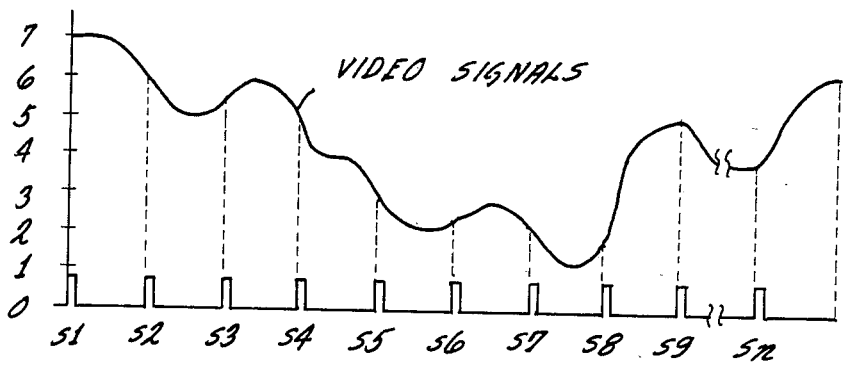
(a)
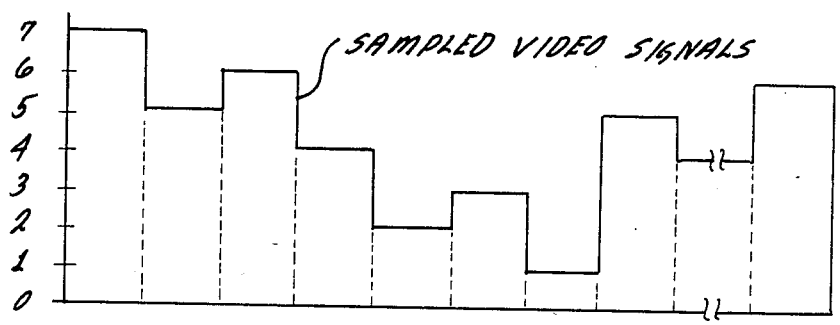
(b)
(c)
3-BIT BINARY CODED VIDEO SIGNALS
| $2^0$ | 1 | 1 | 0 | 0 | 0 | 1 | 1 | 1 | 0 |
|---|---|---|---|---|---|---|---|---|---|
| $2^1$ | 1 | 0 | 1 | 0 | 1 | 1 | 0 | 0 | 1 |
| $2^2$ | 1 | 1 | 1 | 1 | 0 | 0 | 0 | 1 | 1 |
TIME ⟶

SYSTEM FOR DISPLAYING INFORMATION WITH MULTIPLE SHADES OF A COLOR ON A THIN-FILM EL MATRIX DISPLAY PANEL

BACKGROUND OF THE INVENTION

This invention relates to thin-film electroluminescent (EL) matrix display panels and more particularly to a system for enabling such a panel to display information with multiple shades of tones of a color.

It is highly desirable to provide for information to be displayed on a thin-film EL matrix display panel with the use of shading. Thus, when the information to be displayed on the panel is synthesized, such shading makes it possible to provide three dimensional affects or to "highlight" certain portions of the picture, for example, so as to bring them to the attention of the viewer. Moreover, when the information to be displayed on the panel is a video signal provided by a video camera, for example, it is necessary to show the different shades or brightness levels of the picture elements forming the information in order to see objects and scenes as they actually appear to the eye.

Prior art attempts to provide shading of information being displayed on such panels have utilized analog-to-digital converters for digitizing the video signals and then some form of digital-to-analog conversion to modulate the amplitude of the driving pulses for the panel in accordance therewith. Among the disadvantages of this approach is that the brightness-voltage (B-V) operating curve of the panel does not respond linearly to the varying amplitude of the driving pulses. Accordingly, complex circuitry must be devised to make the system work. Moreover, the modulating of the amplitude of the driving pulses results in the panel operating in the inefficient region of its brightness-voltage curve, i.e., along the slope of rather than at the more efficient knee or saturation region thereof.

OBJECTS AND SUMMARY OF THE INVENTION

Accordingly, one of the objects of the present invention is to provide a novel means and method of displaying a picture or pattern on a thin-film EL matrix display panel with different shades of a color.

Another object of the present invention is to provide a system for individually digitally controlling the level of brightness of each of the picture elements on a thin-film EL matrix display panel.

A further object of the present invention is to provide for varying the relative brightness intensity of picture elements on a thin-film EL matrix display panel by controlling the number of times the picture elements are refreshed with respect to each other from a memory during an integration time period comprising a plurality of frame time periods.

A still further object of the present invention is to provide binary weighted memory sections wherein each memory section is read a number of frame time periods according to its binary weight to supply data to refresh the picture elements on a thin-film EL matrix display panel to thereby display information with a plurality of different shades of a color.

Yet, another object of the present invention is to provide a digital brightness control for individual picture elements of a thin-film EL matrix display panel which enables the panel to be operated at all times in the saturation region of its brightness-voltage curve.

In accordance with the present invention, a plurality of memory sections is provided, each storing binary data to be employed for refreshing the picture elements of a thin-film El matrix display panel on successive frame time periods constituting an integration time period. The number of frame time periods in an integration time period corresponds to the number of different shades to be displayed on the panel. The binary data stored in each of the plurality of memory sections differs. Thus, when the binary data in the memory sections are read out on successive frame time periods, some of the picture elements on the panel are refreshed more than others during the integration time period. Accordingly, the eye of the viewer receives more light from some picture elements than others during each integration time period which results in the relative brightness levels and, therefore, the shades of the picture elements to vary.

In a modified embodiment of the present invention, each of the memory sections is binarily weighted and, during an integration time period, each memory section is read out a number of frame time periods corresponding to its binary weight in order to obtain the different brightness levels or shades on the panel.

BRIEF DESCRIPTION OF THE DRAWINGS

Other objects and features of the present invention will become apparent to those skilled in the art from the following description of the invention taken in conjunction with the accompanying drawings, in which:

FIG. 1 is a perspective view, partly broken away, of a typical thin-film EL matrix display panel;

FIG. 2 is a block diagram showing a memory unit with a plurality of memory sections for supplying data to refresh a thin-film EL matrix display panel on successive frame time periods to display information thereon having varying shades of a color in accordance with the present invention;

FIG. 3 illustrates how the memory cells of the memory sections in FIG. 2 may be loaded to display a pattern on the thin-film EL matrix display panel having three shades of a color.

FIG. 4 is a timing chart indicating how the memory sections in FIG. 3 are read during successive frame time periods of an integration time period;

FIG. 5 shows a thin-film EL matrix display panel having a pattern with three shades of a color displayed thereon by reading out the data stored in the memory sections, as illustrated in FIG. 3, during an integration time period;

FIG. 7 is a table indicating how corresponding memory cells in the binary weighted memory sections A, B and C in FIG. 6 are loaded to display a picture or pattern on a thin-film EL matrix display panel having seven shades of a color;

FIG. 8 illustrates how the memory cells of the binary weighted memory sections shown in FIG. 6 are loaded to display a pattern on an thin-film EL matrix display panel having seven shades of a color;

FIG. 10 shows a thin-film EL matrix display panel having a pattern with seven shades of a color displayed thereon by reading out the data stored in the binary weighted memory sections A, B and C, as illustrated in FIG. 8, during an integration time period;

FIG. 11 is a block diagram showing generally how a line of video signals is converted by an analog-to-digital converter into three-bit coded video signals which are stored by stages in the binary weighted memory sections A, B and C, respectively.

FIG 12a shows a line of video signals as generated by the video signal generator in FIG. 11;

FIG. 12b shows the line of video signal in FIG. 12a after being quantized; and

FIG. 12c shows the binary numbers indicative of the three-bit binary coded video signals as generated at the output of the analog-to-digital converter in FIG. 11.

DETAILED DESCRIPTION OF THE INVENTION

Figure 6:
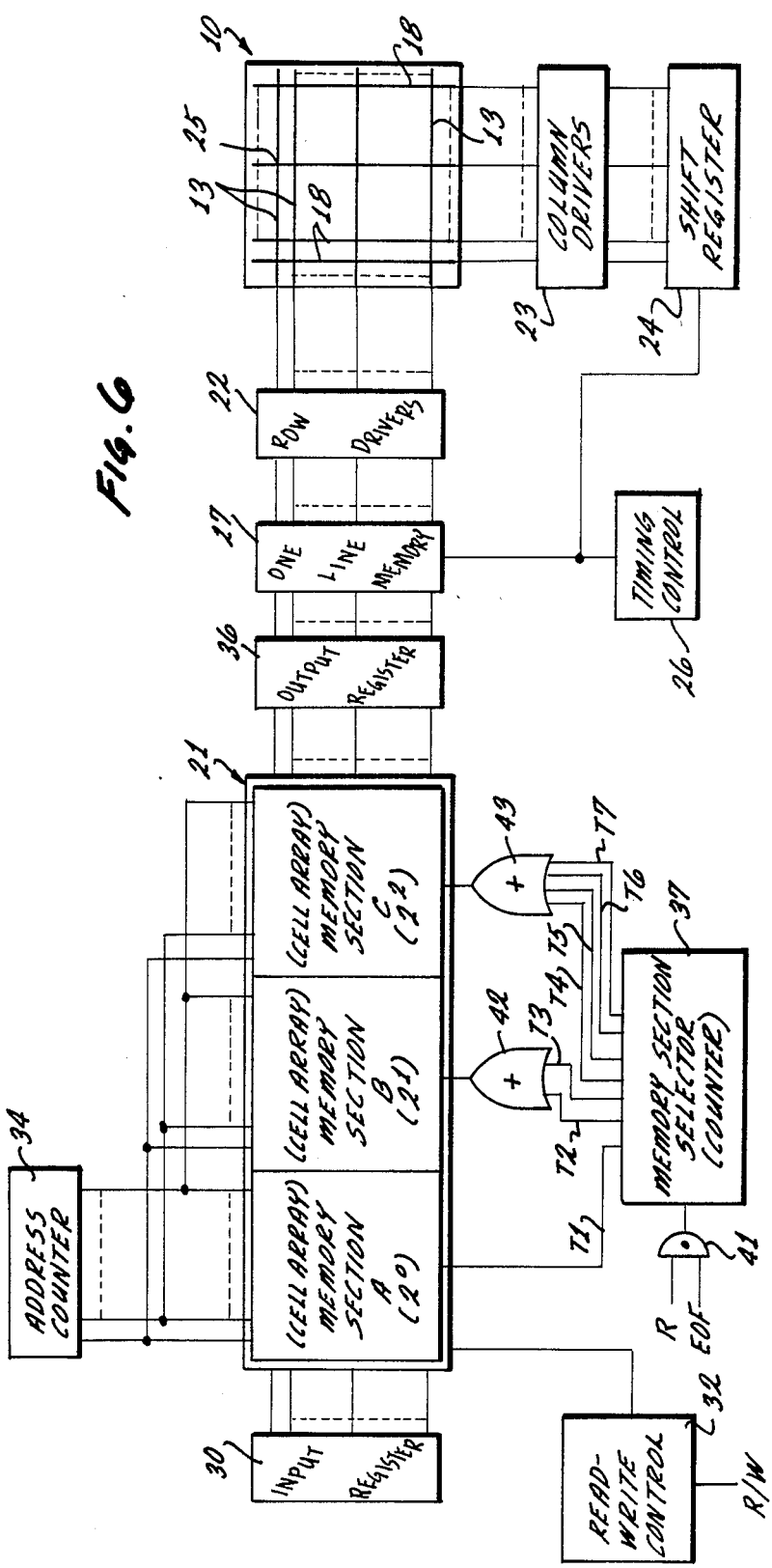
FIG. 6 is a block diagram showing a memory unit with a plurality of binary weighted memory sections for supplying data to refresh a thin-film EL matrix display panel on successive frame time periods to display information thereon having varying shades of a color in accordance with the present invention.

In order to facilitate the understanding of the present invention reference will first be made of FIG. 1 of the drawings which generally depicts a perspective view, partly broken away, of a typical thin-film EL matrix display panel 10 for use with the present invention.

The panel includes a thin-film sandwich structure 11 formed on a glass substrate 12. The sandwich structure initially comprises a plurality of transparent indium tin oxide electrodes 13 formed directly on the glass substrate 12 to a thickness of approximately 2600 Angstrom units. A transparent dielectric layer 14 made of yttria is then deposited on the substrate over the electrodes 13 to a thickness of approximately 3000 Angstrom units. An electroluminescent layer 16, such as zinc sulfide doped with manganese, is then deposited on the dielectric layer 14 to a thickness of approximately 6500 Angstrom units. Another dielectric layer 17 made of yttria is then deposited on the electroluminescent layer 16 to a thickness of approximately 3000 Angstrom units. A plurality of parallel electrodes 18 made of aluminum is then deposited on the dielectric thin-film 17 to a thickness of approximately 1000 Angstrom units. The electrodes 18 are formed so as to be orthogonally positioned with respect to the electrodes 13. Finally, a layer 19 of alumina is deposited to a thickness of approximately 1500 Angstrom units over the back surface of the sandwich structure 11 to encapsulate the electrodes 18. The sandwich structure 11 is then further protected by mounting a back glass cover 20 on the substrate 12 by use of a marginal seal 15.

It should now be appreciated that the layers of the thin-film sandwich structure 11 are greatly exaggerated in the showing of FIG. 1 inasmuch as the entire thickness of the sandwich structure 11 is typically less then two microns.

Reference will next be made to FIG. 2 which shows a block diagram of the system of the present invention which includes the thin-film EL matrix display panel 10 together with a solid state computer memory unit 21 which may be controlled, for example, by a micro computer (not shown) to supply data to be displayed on the panel.

In the plan view of the panel 10 shown in FIG. 2, only the electrodes 13 and 18 are shown. The intervening layers of the sandwich structure 11 including the electroluminescent layer 16 and the dielectric layers 14 and 17 are not shown. Hereinafter, the vertically disposed electrodes 18 will be referred to as the scanning electrodes and the horizontally disposed electrodes 13 will be referred to as the data electrodes.

Column drivers 23 are provided for driving the respective scanning electrodes 18 and row drivers 22 are provided for driving the respective data electrodes 13.

When drive voltages are applied across a pair of scanning and data electrodes 18 and 13, the portion of the electroluminescent layer 16 located at the intersection thereof, which is defined herein as a picture element, such as picture element 25, will luminesce momentarily.

A shift register 24 is provided to control the column drivers 23. The shift register 24 advances a pulse therein in response to each timing signal received from a timing control 26 to successively energize its outputs to gate the respective column drivers 23 to apply a drive voltage onto each of the scanning electrodes 18, in turn, during a frame time period.

A one line memory 27 having a storage element therein for each data electrode 13 provides outputs for controlling the respective row drivers 22. A column of data in an output register 36, as read from a memory section in memory unit 21, is transferred in parallel into the one line memory 27. In response to each timing or enabling signal received from timing control 26, each storage element of the one line memory 27 storing a binary "1" digit serves to simultaneously gate a respective row driver 22 to apply a drive voltage on an associated data electrode 13.

The memory unit 21 may be a conventional solid state memory divided into memory sections A, B and C, as illustrated in FIG. 2. Each memory section comprises a two-coordinate array of memory cells. The memory unit 21 is provided with a common input register 30 and a common output register 36. An address counter 34 is provided for successively selecting the columns of each of the memory sections A, B and C, in turn. A read/write control 32 controls the read and write modes of operation of the memory unit 21.

In a preferred embodiment of the system of the present invention, the panel 10 has a matrix or two-coordinate array of picture elements formed by a set of scanning electrodes 18 and a set of data electrodes 13, the electrodes in each set having a linear resolution of 56 electrodes per inch. Likewise, each of the memory sections A, B and C is formed of a two-coordinate array of memory cells having 56 columns and 56 rows, or a similar capacity. It should thus be evident that a one square inch panel has 3136 picture elements and each of the memory sections A, B and C similarly has 3136 memory cells. However, in order to simplify the understanding of the system of the present invention shown in FIG. 2, each of the two-coordinate arrays of memory cells for memory sections A, B and C is described as having only seven columns and seven rows. Likewise, the panel 10 is described as having a two-coordinate array of picture elements formed of only seven vertical electrodes 18 and seven horizontal electrodes 13. Each of the picture elements on the panel as formed by the intersection of an electrode 13 and 18, such as, for example, picture element 25, has a corresponding memory cell in each of the arrays provided for the memory sections A, B and C.

To write data into or load the memory sections A, B and C in FIG. 2, the read/write control 32 is activated to perform a write function. During the first memory write cycle, a column of data fed into the input register 30 is written in parallel into the first column of memory section A which is selected by the address counter 34. The address counter 34 is then advanced each successive memory write cycle until all the columns of memory section A have been written into. The memory write function then automatically continues for writing data into the columns of memory sections B and C.

To read out the data stored in the memory sections A, B and C in FIG. 2, for display on the EL display panel 10, the read/write control 32 is activated to perform a read function. During the first memory read cycle, the first column of data which is selected by the address counter 34 in memory section A is read out in parallel and stored in the output register 36. The address counter 34 is then advanced each successive memory read cycle until all the columns of memory section A have been read out. The read function is then automatically continued for reading data out of the columns of memory section B and then the columns of memory section C into the output register 36.

As previously described, the data which is read out one column at a time in parallel from a memory section of the memory unit 21 into the output register 36 is transferred to the one line memory 27. Thus, each time the shift register 24 is advanced in response to a timing signal from timing control 26 to gate a column driver 23 to energize a selected scanning electrode 18, the same timing signal from timing control 26 enables the one line memory 27 such that every one of the storage elements thereof that contains a binary "1" digit simultaneously gates a respective row driver to energize an associated data electrode 13. As a result, selected ones of the picture elements located along the length of the selected scanning electrode 18 are refreshed. By repeating the operation of reading a column line data from a memory section of the memory unit 21 into the one line memory 27, as each scanning electrode 18 is energized, all the picture elements on the panel are scanned, a column at a time, within a single frame time period by data in the memory section.

It should now be clearly understood that a frame time period corresponds to the time it takes to read the data stored in all the columns of one of the memory sections A, B or C, and display this data, i.e., refresh the picture elements, on the panel 10.

In order to be able to obtain different shades on the picture elements, in accordance with the present invention, a frame time period is needed for each of the shades in the picture displayed on the panel 10. In the embodiment of the invention shown in FIG. 2, as described in conjunction with FIGS. 3 and 5, three shades of a color are provided. Thus, as shown in FIG. 4, three frame time periods 1, 2 and 3 form an integration time period which latter is the time allowed to enable the eye to integrate the light received from the panel 10, and thus sense the variation in the intensity or level of brightness of the picture elements with respect to each other which results in the different shades being perceived by the eye.

FIG. 3 diagrammatically illustrates how each of the memory sections A. B and C in FIG. 2 is loaded with picture components, i.e., binary "1" digits, to enable a pattern with four shades of a color, as shown in FIG. 5, to be displayed on the panel 10. As illustrated, the maximum brightness level of the pattern displayed on the panel in FIG. 5 is the central picture element 35. Accordingly, the cell 35' in each of the memory sections A, B and C corresponding to picture element 35 has a binary "1" digit stored therein.

The next brightness level of picture elements on the panel 10 in FIG. 5 are the picture elements 38 immediately surrounding the central picture element 35. Thus, the cells 38' in each of the memory sections A and B corresponding to picture elements 38 are each provided with a binary "1" digit and the cells 38' in the memory section C corresponding to picture elements 38 are each provided with a binary "0" digit. The dimmest brightness level of picture elements on the panel in FIG. 5 are picture elements 39 forming the next to the last border of the pattern displayed on the panel. Thus, the cells 39' in the memory section A corresponding to picture elements 39 are each provided with a binary "1" digit whereas the cells 39' in the memory sections B and C are each provided with a binary "0" digit. The zero brightness level of picture elements on the panel 10 in FIG. 5 are the picture elements 40 forming the outer border of the pattern displayed on the panel. Thus, the cells 40' in the memory sections A, B and C corresponding to picture elements 40 are each provided with a binary "1" digit.

In the embodiment of the FIGS. 2-5, if all the components to be used for refreshing the picture or pattern on the panel 10 each successive frame time period were to come from the same memory section, e.g., memory section A, all the picture elements lit on the panel 10 would be at the same intensity, i.e., at the same shade of full brightness. This is the manner in which display panels presently operate and constitute one shade, i.e., the full brightness shade or level of a color. Now then, when during each of the three successive frame time periods comprising an integration time period, as illustrated in FIG. 4, certain picture components, i.e., binary "1" digits, are omitted in either or both of memory sections B and C, as shown in FIG. 3, for example, the shade or brightness level of the corresponding picture elements of the pattern displayed on the panel 10 are changed, i.e., made dimmer.

It should now be clear that what the eye of the observer sees on the panel 10 for the various picture elements is different because in the embodiment of FIGS. 2-5 some picture elements are lit 3 out of 3 frame time periods, others are lit 2 out of 3 frame time periods, others are lit 1 out of 3 frame tme periods, and still others are lit 0 out of 3 frame time periods during each integration time period. Thus, the brightness level that is perceived for each picture element is directly proportional to the number of times it is refreshed during each integration time period. Stated otherwise, the level of brightness generated by a picture element is dependent upon the summation of light perceived during an integration time period by the eye of the viewer.

In order to obtain a design of a shade of color system, it is necessary to start with a frame rate. It is desired for this frame rate to be as fast as the hardware can operate. However, this is not a problem since it is higly desirable for maximum brightness to have the panel operate at its fastest rate even when it provides a single brigthness level for its picture elements. In any event, when the picture or pattern is to be synthesized, a decision must be made as to how many shades of the color are desired in the picture to be viewed on the panel.

Additional shades for the picture elements on the panel 10 can be obtained by providing additional memory sections. Thus, if in the embodiment of FIGS. 2–5, seven shades were desired, it would be necessary to provide seven memory sections and seven frame time periods in an integration time period.

Thus, to display a picture on the panel with multiple shades of a color in accordance with the embodiment in FIG. 2, a certain number of frame time periods is required, one for each shade, and it is necessary to assign a different section of the memory unit 21 to each of these frame time periods. Then, it is necessary to place a binary "1" digit into the cells of certain ones of the memory sections. Thus, at the end of the accessing of all the columns of data in all the memory sections, all the picture components of the picture with its shades of color have been accessed and it is necessary to start all over again and access all the columns of picture components in all the memory sections again during the next integration time period. The integration time period is thus defined as the smallest time period in which all the levels of the shades are shown.

It should be noted that the integration time period must be less than the period of time which will cause flicker in any portion of the picture being displayed on the panel. In particular, the integration time period must be less than the flicker period between the repeated refreshing of the picture elements with the dimmest shades, otherwise flicker of these elements of the picture will occur.

Reference will next be made to FIGS. 6–10 which show a modified embodiment of the present invention wherein the memory sections A, B and C are binarily weighted to provide for as many as seven shades of color on the panel 10.

Figure 9:
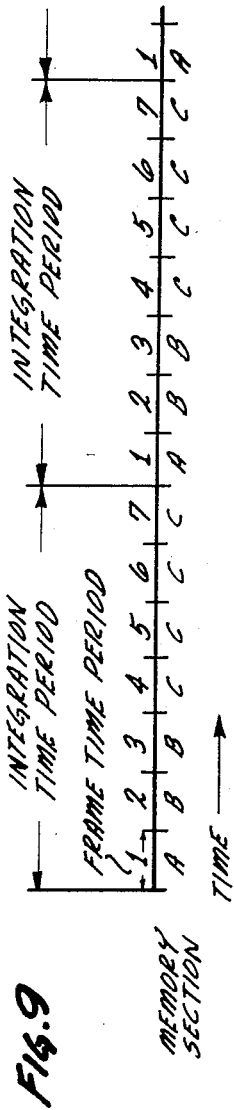
FIG. 9 is a timing chart indicating how the binary weighted memory sections in FIG. 6 are read during successive frame time periods of an integration time period.

The block diagram of FIG. 6 is similar to FIG. 2 with the exception that a memory section selector 37 is provided for controlling the reading out of the binary weighted memory sections A, B and C on successive frame time periods in accordance with the timing chart of FIG. 9.

For the purpose of simplifying the explanation, each of the binary weighted memory sections A, B and C in FIG. 6 is assumed to be formed of an array of memory cells having fifteen columns and fifteen rows, and the panel 10 is assumed to be formed with fifteen vertical electrodes 18 and fifteen horizontal electrodes 13. As described in connection with the embodiment shown in FIGS. 2–5, each of the picture elements on the panel, such as picture element 25, formed by the intersection of a pair of electrodes 13 and 18 has a corresponding memory cell in each of the cell arrays forming the binary weighted memory sections A, B and C.

As illustrated in the block diagram of FIG. 6, the memory sections A, B and C are binarily weighted to correspond to binary stages $2^0$, $2^1$ and $2^2$, respectively. Each of the memory sections A, B and C is selected by the memory section selector 37 to be read on successive frame time periods a number of times corresponding to its binary weight. Memory section selector 37 is a counter which responds during a memory read function R to each "end of frame" signal (EOF). Thus, each time both the R and EOF signals are present on "and" gate 41, the memory section selector 37 advances to successively apply a high logic level on its seven outputs T1 to T7, inc. A high logic level on the first output T1 renders memory section A operable. A high logic level on either of the second or third outputs T2 and T3 operates through an "or" circuit 42 to render memory section B operable. A high logic level on any one of the fourth, fifth, sixth or seventh outputs T4–T7 operates through "or" circuit 43 to render memory section C operable. Thus, as indicated in FIG. 9, the memory section selector 37 selects the memory section A to be read during the first frame time period, the memory section B to be read during the second and third frame time periods, and the memory section C to be read during the fourth, fifth, sixth and seventh frame time periods of each integration time period.

The table in FIG. 7 illustrates the manner in which the data, i.e., binary "1" digits, corresponding to each picture element on the panel 10, are stored in the three memory sections A, B and C to provide for the seven brightness levels 1 through 7.

Referring to FIG. 8, it should be noted that each of the binary weighted memory sections A, B and C has a binary "1" digit stored in a cell 50' thereof corresponding to the central picture element 50 on the panel. Accordingly, the brightness level of the picture element 50 on the panel will be at its maximum brightness level of 7 as indicated by the binary number 111 in the table of FIG. 7. That is, the picture element 50 is caused to luminesce during each of the seven frame time periods comprising an integration time period. The picture element 50 thus has the maximum brightness level of 7/7.

In FIG. 8, memory sections A and C have a binary "1" digit in each of the memory cells 51' thereof corresponding to picture elements 51 on panel 10, and memory section B has a binary "0" digit in each of its memory cells 51'. Accordingly, the picture elements 51 on the panel will have a brightness level of 5 as indicated by the binary number 101 in the table of FIG. 7. That is, the picture elements 51 are caused to luminesce once as a result of the reading of memory section A during frame time period 1, is not caused to luminesce as a result of the reading of memory section B during each of the frame time periods 2 and 3, and is caused to luminesce four times, as a result of the reading of memory section C during each of the frame time periods 4, 5, 6 and 7 of an integration time period. The picture elements 51 thus have a relative brightness level of 5/7.

Still further, in FIG. 8, memory section C has a binary "1" digit in each of the memory 52' thereof corresponding to picture elements 52 on panel 10 and memory sections A and B each have a binary "0" digit in their memory cells 52'. Accordingly, the picture elements 52 on the panel will have a brightness level of 4 as indicated by the binary number 001 in the table of FIG. 7. That is, the picture elements 52 are not caused to luminesce as a result of the reading of memory sections A during frame time period 1 and are not caused to luminesce during the reading of memory section B during frame time periods 2 and 3. However, the picture elements 52 are caused to luminesce as a result of reading the memory section C during each of the frame time periods 4, 5, 6 and 7 of an integration time period. The picture elements 52 thus have a relative brightness level of 4/7.

Moreover, in FIG. 8, all three of the memory sections A, B and C have a binary "0" digit in their memory cells 53' corresponding to picture elements 53 on panel 10. Accordingly, the picture elements 53 on the panel will have a zero brightness level as indicated by the binary number 000 in the table of FIG. 7. That is, the picture elements 53 are not caused to luminesce during each of the seven frame time periods of the integration time period. The picture elements 53' thus have a relative brightness level of 0/7.

It should now be clear that the picture elements forming each of the successive borders on the panel 10 surrounding the central picture element 50 do not have a binary "1" digit in each of the corresponding memory cells of all these memory sections A, B and C but, rather, these cells are loaded according to the brightness levels shown in the table of FIG. 7. Accordingly, the picture elements in each of the successive borders of the pattern displayed on the panel have decreasing degrees of shades or brightness levels, as shown in FIG. 10.

Thus, if the light emitted by a picture element during an integration time period is, say, 3/7 of the maximum of 7/7, it will be integrated by the eye and be of lesser brightness than the other picture elements which are refreshed a greater number of times, or of greater brightness than the other picture elements which are refreshed a lesser number of times during the integration time period.

It should be further understood that this method of obtaining shades of a color on a picture displayed on a panel 10 operates independently of the brightness-voltage (B-V) characteristic curve in that each time a picture element is refreshed the light that is being integrated by the eye is always the same peak pulse of light for the panel, i.e., the peak pulse as obtained in the saturation region of the brightness-voltage curve for the panel. It should be appreciated that these peak pulses can be added together in a linear manner as long as each peak pulse decays before the next peak pulse comes along to ensure that the light of each is separately integrated by the eye. Accordingly, it is desirable for the panel 10 to have a phosphor with a fast decay.

The advantage of binarily weighting the memory sections A, B and C is that it saves on the size of the memory unit 11 needed to store the data required to operate the panel. This is especially useful when a large number of shades is desired. Thus, by providing an additional memory section D in the modified embodiment shown in FIG. 6 and expanding on the table in FIG. 7 so as to provide four binary stages, i.e., four binary weighted memory sections, it is possible to provide as many as 16 shades of a color, i.e., double the available number of shades as compared to the use of three binary weighted memory sections. Accordingly, memory section A would be read once, memory section B would be read twice, memory section C would be read four times, and memory section D would be read eight times during each integration time period. Moreover, by providing an additional memory section E, and expanding still further on the table in FIG. 7, as to provide five binary stages, i.e., five binary weighted memory sections, it is possible to provide as many as 32 shades of a color, i.e., again double the available number of shades as compared to the use of four binary weighted memory sections. Of course, to achieve such a high resolution of shades it is necessary to be able to operate the memory unit 11 and the panel 10 at sufficient speed such that the integration time period, which would now be 32 frame time periods long, does not exceed the time period at which the dimmest picture elements to be displayed will start to flicker.

Reference will next be made to FIG. 11 which shows a block diagram of a circuit arrangement for loading the binary weighted memory sections A, B and C of a memory unit 49 with video signals serially generated by a video signal generator 45. The video signal generator 45 successively generates a number of lines of video signals, the number of lines corresponding to the number of scanning electrodes 18 on the panel 10.

As shown in FIG. 12a, each line of the serially generated video signals is periodically sampled by sampling pulses S1, S2, S3, etc., the number of sampling pulses for each line corresponding to the number of data electrodes 12 on the panel 10. Each sampled video signal is quantized in the analog-to-digital converter 47 into one of eight levels, 0 to 7, inc., as indicated in FIG. 12b. These different levels of the quantized signals are then converted in the analog-to-digital converter 47 into three-bit binary coded video signals, as shown in FIG. 12c.

As shown in FIG. 11, the binary digits, i.e., the stages $2^0$, $2^1$, and $2^2$, of the three-bit binary coded signals on the respective outputs of the analog-to-digital converter 47 are respectively fed into shift registers 60, 61 and 62 which are under control of a micro computer 70. When a data word, i.e., eight bits, has been so loaded into each of these shift registers, the micro computer 70 provides for transferring the data word in each shift register, in parallel, into its associated buffer 64, 65 and 66. This frees the shift registers so that they can continue to respectively receive stages of the following three-bit binary coded video signals generated at the output of the analog-to-digital converter 47.

The micro computer 70 then provides for transferring the data word in the buffer 64 into the memory input register 54 and writing this data word into memory section A. Next, the micro computer 70 provides for transferring the data word in buffer 65 into the memory input register 54 and writing this data word into memory section B. Finally, the micro computer 70 provides for transferring the data word in the buffer 66 into the memory input register 54 and writing this word into memory section C.

This routine continues until all the three-bit binary coded video signals (FIG. 12c) corresponding to all the lines of video signals to provide a picture have been loaded by stages into corresponding memory cells of the memory sections A, B and C.

Having once loaded the memory sections A, B and C, the contents of each can be read out, in accordance with its binary weight, a data word at a time into the memory output register 55 and transferred to fill the one line memory 27 (FIG. 6). The data in the one line memory 27 is thus successively made available for use in refreshing the picture elements on the panel on each of the frame time periods of an integration time period in the manner as previously described in connection with the embodiment in FIGS. 6–10.

In the event that it is desired to display the lines of video signals on the panel 10 on a real time basis, it should be noted that the loading and the reading out of the binary weighted memory sections A, B and C in FIG. 11 can be performed by an interleaving process. That is, the memory unit 49 can be controlled by the micro computer 70 to alternately write a data word into one portion of a memory section and read a data word out of another portion of the memory section. By interleaving the memory reading and writing cycles in this manner, the data in the memory sections can be continually updated as it is being read out to refresh the panel to display the information with shades of a color.

While the shades of a color system shown and described herein for a thin-film EL matrix display panel is admirably adapted to fulfill the objects and advantages previously mentioned as desirable it is to be understood that the invention is not limited to the specific features shown and described but that the means and method herein disclosed are susceptible of modification in form, proportions and arrangements of parts without departing from the principles involved or sacrificing any of its advantages and the invention, therefore, may be modified in various forms within the scope of the appended claims.

What is claimed is:

1. A system for displaying information with multiple shades of a color on a thin-film EL display panel having a two-coordinate array of picture elements, said system comprising:

drive circuit means associated with said display panel for scanning and selectively refreshing the picture elements thereof with a frame of data during a frame time period;

a plurality of memory sections, each memory section having a two-coordinate array of memory cells;

each memory section having a memory cell corresponding to each picture element on the panel;

input means for storing a different frame of data into each of said memory sections, a number of the memory sections having data stored in the memory cells thereof corresponding to each picture element on the panel defining the shade of said picture element; and reading means for successively reading each of said memory sections and supplying the frame of data therein to said drive circuit means to thereby provide for scanning and selectively refreshing the picture elements on said panel with data stored in corresponding memory cells of each of said memory sections during a number of successive frame time periods, the number of successive frame time periods needed to so scan and refresh the picture elements on said panel with data from each of the memory sections defining an integration time period;

whereby during each successive integration time period each picture element on the panel is refreshed a number of times as determined by the number of memory sections having data stored in the memory cells thereof corresponding to said picture element to thereby vary the shade with which the picture elements are viewed by an eye of an observer.

2. A system for displaying information with multiple shades of a color on a thin-film EL display panel having a matrix array of picture elements which can be scanned and selectively refreshed with a frame of data supplied thereto during a frame time period, said system comprising:

a plurality of memory sections, each memory section having a matrix array of memory cells;

each memory section having a memory cell corresponding to each picture element on the panel;

writing means for storing a different frame pattern of data relating to the shades of the picture elements into each of said memory sections, wherein each of the shades to be displayed on the picture elements on the panel is defined by having a different number of the memory sections storing data in the memory cells thereof corresponding to a picture element;

reading means for reading the frame pattern of data from each of said memory sections during successive frame time periods; and drive circuit means associated with said panel and successively responsive to the frame pattern of data read by said reading means out of each of said memory sections for scanning the picture elements on said panel and selectively refreshing those having data stored in corresponding memory cells thereof during a number of successive frame time periods, the number of successive frame time periods needed to enable said drive circuit means to so scan and refresh the picture elements on the panel with the frame pattern of data from each of the memory sections defining an integration time period;

whereby during each successive integration time period each picture element on said panel is refreshed a number of times as determined by the number of memory sections that have data stored in the memory cells thereof corresponding to said picture element to thereby vary the shades by which the picture elements are being viewed by an eye of an observer.

3. A system for displaying information with multiple shades of a color on a thin-film EL panel as defined in claim 2 wherein said multiple shades of a color vary from a dimmest shade to a brightest shade and wherein said integration time period is shorter than a time period which causes the picture elements with the dimmest shade to flicker.

4. A system for displaying information with multiple shades of a color on a thin-film EL display panel having a matrix array of picture elements, each of the shades of the picture elements to be viewed on the panel being defined by a plural-stage binary weighted code wherein the data representing respective stages of the binary weighted code has numerical weights $2^0, 2^1, 2^2 - - - 2^n$, respectively, said system comprising:

a plurality of memory sections, each memory section having a matrix array of memory cells;

each memory section having a memory cell corresponding to each picture element on the panel;

writing means for storing data representing the respective stages of the plural-stage binary weighted code defining the shades of each of the picture elements on the panel into corresponding memory cells of respective ones of said memory sections;

reading means connectable to read the data stored in any one of said memory sections during a frame time period;

drive circuit means operable in response to data read from a memory section during a frame time period to scan the picture elements on said panel and selectively refresh those having data stored in corresponding memory cells of said memory sections; and memory section selector means for connecting said reading means to read each memory section and supply data to said drive circuit means for a number of successive frame time periods equal to the numerical weight of the data representing the stage of the plural-stage binary weighted code stored in said memory section, the number of successive frame time periods needed to enable each of the memory sections to be so connected to supply data to said drive circuit means defining an integration time period;

whereby during each successive integration time period some of the picture elements are refreshed more than others to thereby vary the shades by which the picture elements are viewed by an eye of an observer.

5. A system for displaying information with multiple shades of a color on a thin-film EL display panel having a matrix array of picture elements as defined in claim 4 including:

a source of video signals;

an analog-to-digital converter responsive to each sampled portion of said video signal to provide the data representing the respective stages of the plural-stage binary weighted code indicative of the shade of each picture element on the panel corresponding to said sampled portion of the video signal;

a plurality of buffer means;

input means for storing the data representing the respective stages of said plural-stage binary weighted code in respective ones of said buffer means; and output means for feeding the data from each of said buffer means to said writing means.

6. A system for displaying information with multiple shades of a color on a thin-film EL display panel having a matrix array of picture elements capable of being scanned and selectively refreshed to display a frame of data on said panel during a frame time period, the shade of each picture element on said panel being defined by a plural-stage binary weighted code wherein the data representing each stage of said binary weighted code has a numerical weight;

a plurality of memory sections, each memory section having a matrix array of memory cells;

each memory section having a memory cell corresponding to each picture element on the panel;

writing means for storing data representing the respective stages of the plural-stage binary weighted code defining the shades of each of the picture elements in corresponding memory cells of respective ones of said memory sections;

reading means including memory section selector means for reading data from each of the memory sections during each of a number of successive frame time periods equal to the weight of the respective stage of the plural-stage binary weighted code represented by said data; and drive circuit means for scanning and selectively refreshing the picture elements on the panel in response to data read from corresponding memory cells of each memory section a number of successive frame time periods equal to the weight of the data stored therein, the number of successive frame time periods needed to so refresh the picture elements on the panel with data read from each of the memory sections defining an integration time period;

whereby during each successive integration time period each picture element on the panel is refreshed a number of times as determined by the number of frame time periods the memory sections having data stored in the memory cells thereof corresponding to said picture element are read and supplied to said drive circuit means, thereby varying the shades by which the picture elements are viewed on the panel.

7. A method for displaying information with multiple shades of a color on a thin-film EL panel having a matrix array of picture elements capable of being scanned and selectively refreshed by a frame of data supplied thereto during a frame time period, said method comprising:

providing a plurality of memory sections, each memory section having a matrix array of memory cells, each memory section having a memory cell corresponding to each picture element on said panel;

writing data representing the shades of the picture elements in selected ones of the memory cells of each of said memory sections, wherein each of the shades to be displayed on the picture elements on the panel is defined by having a different number of the memory sections storing data in the memory cells thereof corresponding to a picture element;

reading the data from each of said memory sections; and refreshing the picture elements on said panel during each of a number of successive frame time periods with data read from corresponding memory cells of a different one of said memory sections, the number of successive frame time periods needed to so refresh the picture elements with data from each of the memory sections defining an integration time period;

whereby during each successive integration time period each picture element on the panel is refreshed a number of times as determined by the number of memory sections having data stored in the memory cells thereof corresponding to said picture element with the result that the picture elements are displayed on the panel with different shades.

8. A method for displaying information with multiple shades of a color on a display panel having a two-coordinate array of picture elements capable of being scanned and selectively refreshed with a frame of data supplied thereto during a frame time period, said method comprising:

providing a plurality of memory sections, each memory section having a two-coordinate array of memory cells, each memory section having a memory cell corresponding to each picture element on said panel;

writing shade data in the memory cells of each of said memory sections, some of said memory sections storing shade data in some of the memory cells thereof not stored in corresponding memory cells of other of said memory sections, each said memory section storing shade data to be used to refresh picture elements on the panel during a frame time period;

reading the shade data from each of said memory sections; and refreshing the picture elements on the panel during each of a number of successive frame time periods in accordance with the shade data read from a different one of said memory sections, the number of successive frame time periods needed to so refresh the picture elements defining an integration time period;

whereby some of the picture elements on the panel are refreshed more than others during an integration time period resulting in the picture elements appearing to an eye of an observer with different shades.

9. A method for displaying information with multiple shades of a color on a thin-film EL panel having a matrix array of picture elements capable of being scanned and selectively refreshed with a frame of data supplied thereto during a frame time period, said method comprising:

defining each of said multiple shades of a plural-stage binary weighted code wherein the data representing respective stages of the binary weighted code has numerical weights $2^0, 2^1, 2^2, ---2^n$, respectively;

defining a plurality of successive frame time periods, one for each of the shades to be displayed on the panel, said plurality of successive frame time periods defining an integration time period;

providing a plurality of memory sections, one for each stage of the plural-stage binary weighted code, each memory section having a matrix array of memory cells, and each memory section having a memory cell corresponding to each picture element on said panel;

inputting the data representing the respective stages of the plural-stage binary weighted code defining the shade of each of the picture elements on the panel in corresponding memory cells of respective ones of said memory sections;

reading the data from each of the memory sections during each of a number of successive frame time periods equal to the weight of the stage represented by the data stored therein; and scanning the picture elements on the panel while refreshing selected ones thereof in accordance with data so read from corresponding memory cells of each of the memory sections, whereby during each integration time period the picture elements on the panel are scanned and selectively refreshed with data read from each of said memory sections during each of said number of successive frame time periods equal to the weight of the stage represented by the data stored therein;

whereby during each successive integration time period each picture element on the panel is refreshed a number of times as determined by the number of times each memory section having data stored in the memory cell thereof corresponding to said picture element is read, to thereby vary the shades by which the picture elements are viewed by an eye of an observer.

10. A method for displaying information with multiple shades of a color on a thin-film EL panel having a matrix array of picture elements capable of being scanned and selectively refreshed with a frame of data supplied thereto during a frame time period, said method comprising:

defining each of said multiple shades of a plural-stage binary weighted code wherein the data representing each of the stages of the binary weighted code has a numerical weight;

defining a plurality of successive frame time periods, one for each of the shades to be displayed on the panel, said plurality of successive frame time periods defining an integration time period;

providing a plurality of memory sections, one for each stage of the plural-stage binary weighted code, each memory section having a matrix array of memory cells, and each memory section having a memory cell corresponding to each picture element on said panel;

inputting the data representing the respective stages of the plural-stage binary weighted code defining the shades of each of the picture elements in corresponding memory cells of respective memory sections;

reading the data from each of the memory sections during each of a number of successive frame time periods equal to the weight of the stage represented by the data stored therein; and scanning the picture elements on the panel while refreshing selected ones thereof in accordance with the data so read from corresponding memory cells of each of the memory sections, whereby during each integration time period the picture elements on the panel are scanned and refreshed with data read from each of the memory sections during each of said number of successive frame time periods equal to the weight of the stage represented by the data stored therein;

whereby during each successive integration time period each picture element on the panel is refreshed a number of times as determined by the number of times each memory section having data stored in the memory cells thereof corresponding to said picture element is read, to thereby vary the shades by which the picture elements are viewed by an eye of an observer.

* * * * *